(12) United States Patent
Miura et al.

(10) Patent No.: US 8,466,364 B2
(45) Date of Patent: Jun. 18, 2013

(54) CABLE FIXING MEMBER AND CABLE FIXING STRUCTURE

(75) Inventors: Tsuyoshi Miura, Hitachi (JP); Hirotaka Eshima, Hitachi (JP); Yoji Kobayashi, Hitachi (JP)

(73) Assignee: Hitachi Cable Ltd., Tokyo (JP)

( * ) Notice: Subject to any disclaimer, the term of this patent is extended or adjusted under 35 U.S.C. 154(b) by 73 days.

(21) Appl. No.: 13/104,366

(22) Filed: May 10, 2011

(65) Prior Publication Data

US 2011/0284285 A1    Nov. 24, 2011

(30) Foreign Application Priority Data

May 18, 2010   (JP) .................................. 2010-114693
May 18, 2010   (JP) .................................. 2010-114694
May 18, 2010   (JP) .................................. 2010-114695

(51) Int. Cl.
*H01R 4/00* (2006.01)
*H01B 17/16* (2006.01)
*H01R 4/10* (2006.01)

(52) U.S. Cl.
USPC ...................... 174/84 C; 174/163 R; 439/877

(58) Field of Classification Search
USPC . 248/74.1; 174/163 R, 84 C, 102 R; 439/421, 439/427, 430, 442, 585, 607.48, 607.5, 730, 439/741, 877, 878
See application file for complete search history.

(56) References Cited

U.S. PATENT DOCUMENTS

| | | | | |
|---|---|---|---|---|
| 4,148,557 | A | * | 4/1979 | Garvey ............................ 385/87 |
| 5,089,666 | A | * | 2/1992 | DiVila ......................... 174/74 R |
| 6,875,918 | B2 | * | 4/2005 | Sudo et al. ..................... 174/363 |
| 7,581,564 | B2 | * | 9/2009 | Tanaka et al. .................. 138/110 |
| 7,653,987 | B2 | | 2/2010 | Tokuda et al. |
| 2006/0062080 | A1 | * | 3/2006 | Scott ................................ 367/21 |
| 2007/0234559 | A1 | * | 10/2007 | Tokuda et al. ................... 29/755 |

FOREIGN PATENT DOCUMENTS

JP          2007276738  A    10/2007

* cited by examiner

*Primary Examiner* — Hoa C Nguyen
*Assistant Examiner* — Binh Tran
(74) *Attorney, Agent, or Firm* — Marty Fleit; Paul D. Bianco; Fleit Gibbons Gutman Bongini Bianco PL

(57) ABSTRACT

There is provided a cable fixing member, comprising: an intermediate member crimped and tightened to a cable; a pair of bracket members for clamping and grasping one or a plurality of cables with the intermediate member tightened thereto, through the intermediate member; and one or a plurality of grooves formed on facing surfaces of the pair of bracket members by which the cable is clamped, for clamping the cable through the intermediate member, wherein an inner surface shape of the groove is formed to mesh with an outer surface shape of the intermediate member which is crimped and tightened to the cable.

8 Claims, 17 Drawing Sheets

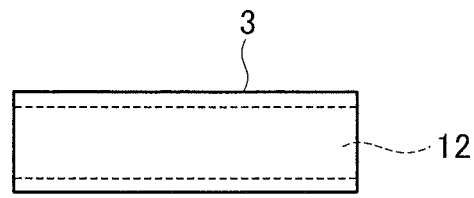
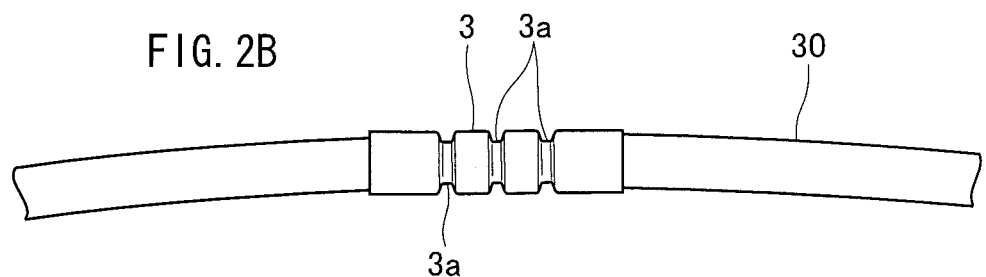
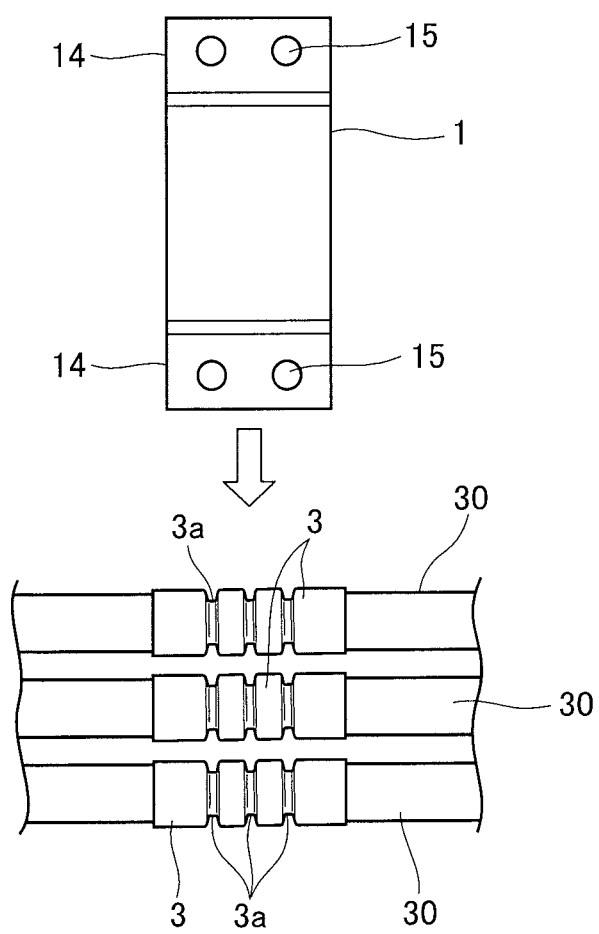

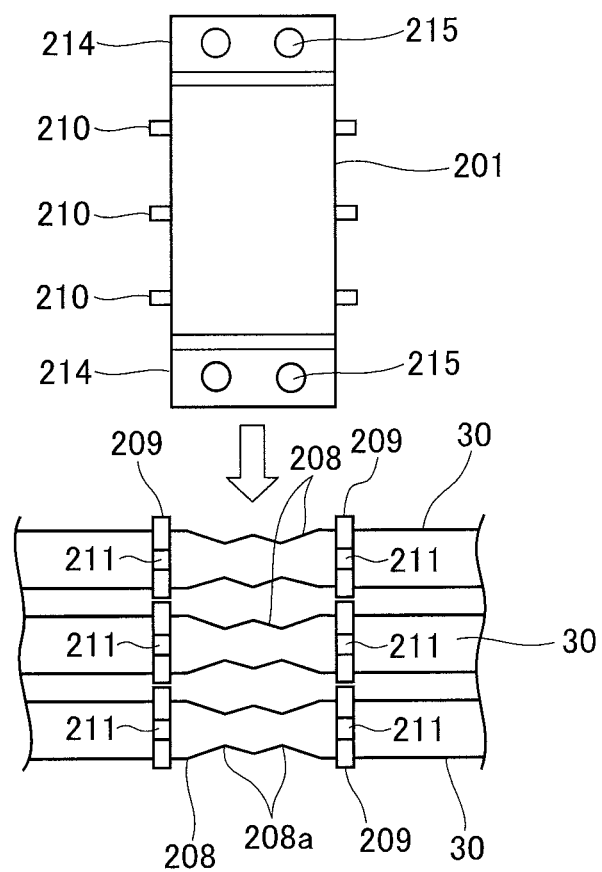

CABLE FIXING MEMBER AND CABLE FIXING STRUCTURE

The present application is based on Japanese Patent Applications No. 2010-114693, No. 2010-114694 and No. 2010-114695, filed on May 18, 2010, the entire contents of which are hereby incorporated by reference.

BACKGROUND OF THE INVENTION

1. Field of the Invention

The present invention relates to a cable fixing member and a cable fixing structure for fixing a cable to a vehicle body, etc.

2. Description of the Related Art

When a cable, electric wire, etc., (simply called "cable" hereafter) is wired or laid, and for example is wired under a suspension of an automobile, (called "under a vehicle spring" hereafter), an intermediate portion of the wired cable is held and fixed to a vehicle body side, to thereby prevent a contact between a tire or other components and the cable. A metal clamp is generally used for a fixing part of the cable. The metal clamp has a function of clamping an outer periphery of the cable from both sides by a metal component, and the metal component, by which the cable is clamped, is fixed to a vehicle body, etc., by using a screw, etc., to thereby hold the cable.

As an example of a conventional metal clamp, patent document 1 discloses a clamp for allowing a rotation, although controlling an axial movement of the electric wire, in an electric wire holding device for holding the electric wire for supplying electric power to an in-wheel motor which is incorporated in a wheel of an automobile. Such a clamp has a structure as follows: a cushioning cylindrical member attached to (or fitted to) the outer periphery of the electric wire by an adhesive agent, etc., is clamped from both sides by a clamp body component, and the electric wire is rotatably supported by providing a bearing structure between the cushioning cylindrical part and the clamp body component. According to the clamp with such a structure, it may be possible to suppress a breakage of the electric wire due to repeated bending of the electric wire which is caused by a vertical movement of the wheel, by allowing a rotation of the electric wire.

[Patent document 1]

Japanese Patent Laid Open Publication No. 2007-276738

However, according to a conventional metal clamp, a force to grasp and fix the cable is small, thus involving a problem that disconnection, etc., occurs, by detachment of the cable from a designed fixing part. Particularly, when the cable is used under the vehicle spring, the cable is bent or vibrated, with foreign matters such as mud or snow adhered thereto, thus adding an excessive tensile force to the cable. In this case, if the force to fix and grasp a clamp portion for fixing the cable is small, the cable is moved and is brought into contact with surrounding components, and there is a large possibility that the cable is damaged and disconnected.

Further, when the cable is clamped by the metal component, the force to clamp the cable is easily unevenly added, and a positional relation between the metal clamp and the cable becomes different from a designed value. Therefore, an unintended great force is added locally to the cable, with a result that a designed layout position of the cable is deviated, thereby involving a problem that a trouble such as disconnection occurs.

Even if the clamp of the aforementioned document 1 is used, it is difficult to surely fix the electric wire when a great force is added to the electric wire, because the force to fix and grasp the cable is small, due to a structure that the cushioning cylindrical member is attached to the outer periphery of the electric wire by the adhesive agent, etc. Further, according to the clamp of the patent document 1, although the rotation (twist) of the electric wire is allowed by the bearing structure, the twist of the electric wire occurs incidentally and unexpectedly due to the vertical movement of the wheel, with a result that the surrounding components and the electric wire are brought into contact with each other, or unintended strain is generated in the electric wire, leading to the disconnection. Further, the movement of the cable involving the twist is extremely complicated, and therefore it is difficult to estimate and design a cable layout beforehand, with the twist of the cable added.

BRIEF SUMMARY OF THE INVENTION

Therefore, it is desired to provide a cable fixing member and a cable fixing structure capable of firmly holding and fixing a cable with high reliability.

According to a first aspect of the present invention, there is provided a cable fixing member, comprising: an intermediate member crimped and tightened to a cable;

a pair of bracket members for clamping and grasping one or a plurality of cables with the intermediate member tightened thereto, through the intermediate member; and one or a plurality of grooves formed on facing surfaces of the pair of bracket members by which the cable is clamped, for clamping the cable through the intermediate member, wherein an inner surface shape of the groove is formed to mesh with an outer surface shape of the intermediate member which is crimped and tightened to the cable.

According to other aspect of the present invention, there is provided a cable fixing member, comprising:

an intermediate member crimped and tightened to a cable;

a pair of bracket members for clamping and grasping one or a plurality of cables with the intermediate member tightened thereto, through the intermediate member;

one or a plurality of grooves formed on facing surfaces of the pair of bracket members by which the cable is clamped, for clamping the cable through the intermediate member;

a hole provided to one or the plurality of grooves; and a protrusion provided on an outer peripheral part of the intermediate member, so as to be inserted into the hole.

According to other aspect of the present invention, there is provided a cable fixing member, comprising:

an intermediate member crimped and tightened to a cable:

a pair of bracket members for clamping and grasping one or the plurality of cables with the intermediate member tightened thereto, through the intermediate member;

one or a plurality of grooves formed on facing surfaces of the pair of bracket members by which the cable is clamped, for clamping the cable through the intermediate member;

a notch provided to the intermediate member; and a protrusion provided to the bracket members, so as to be inserted into the notch.

According to further other aspect of the present invention, there is provided a cable fixing structure, wherein a cable having a reinforcing braid on an outer peripheral part is fixed to a cable attaching member, by using the cable fixing member according to any one of the aforementioned aspects.

BRIEF DESCRIPTION OF THE DRAWINGS

FIG. 2A is a front view of an intermediate member in the cable fixing member according to the embodiment 1 of the present invention.

FIG. 2B is a view showing a state that the intermediate member in the cable fixing member according to the embodiment 1 of the present invention is crimped and tightened to a cable.

FIG. 3 is a view showing one of the procedures of fixing the cable by using the cable fixing member according to the embodiment 1 of the present invention.

FIG. 24 is a view showing the cable fixing member according to other embodiment of the present invention.

DETAILED DESCRIPTION OF THE INVENTION

An embodiment of a cable fixing member and a cable fixing structure according to the present invention will be described hereafter.

Embodiment 1

Figure 1A:
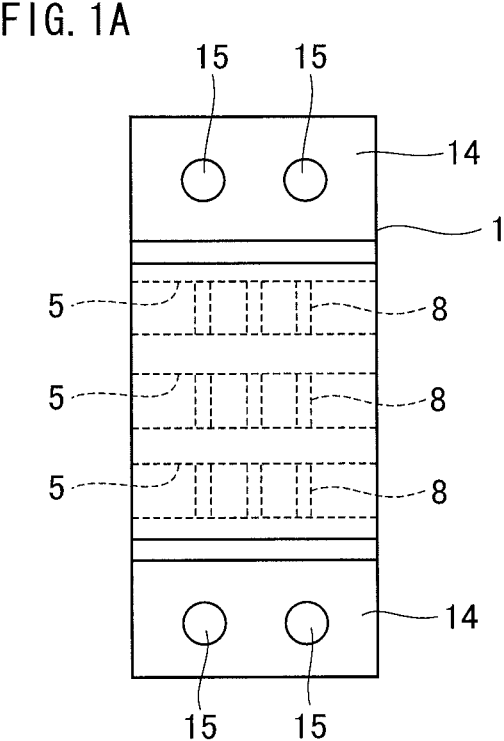
FIG. 1A is a view showing a bracket member in a cable fixing member according to an embodiment 1 of the present invention, viewed from an opposite side to a facing surface.
Figure 1B:
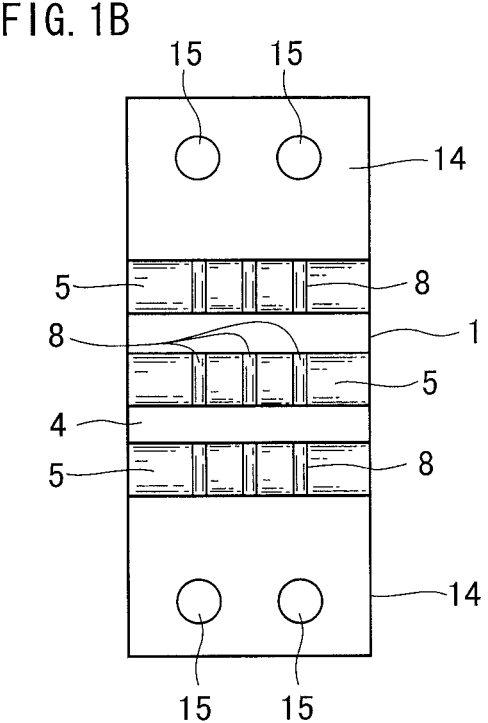
FIG. 1B is a view showing the bracket member in the cable fixing member according to the embodiment 1 of the present invention, viewed from the opposite side to the facing surface.
Figure 1C:
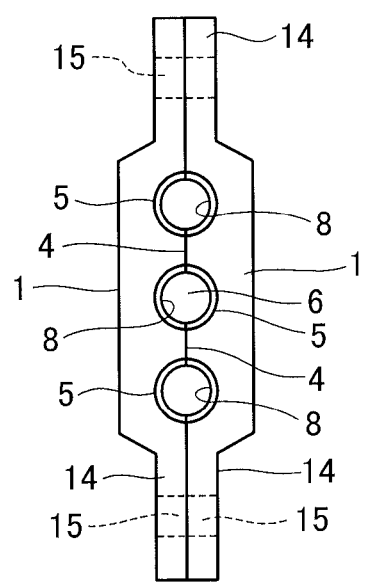
FIG. 1C is a side view of a close contact state of the facing surfaces between a pair of bracket members in the cable fixing member according to the embodiment 1 of the present invention.

FIG. 1 shows a bracket member in the cable fixing member according to embodiment 1 of the present invention. FIG. 1A is a view of a bracket member viewed from an opposite side to a facing surface, FIG. 1B is a view of the bracket member viewed from the facing surface side, and FIG. 1C is a side view of a state that a pair of bracket members with facing surfaces set in a close contact state.

As shown in FIG. 1A to FIG. 1C, a pair of bracket members 1, 1 of this embodiment are used for grasping three cables and fixing them to a vehicle body, etc., and three rows of grooves for clamping and grasping the cable are formed on the facing surface of the bracket member 1. Cross-sectional faces of the grooves are respectively formed into a semi-circular shape for clamping and grasping an outer periphery of the cable from both sides of the bracket members 1, 1, so as to correspond to the circular sectional face of the cable (for example, see FIG. 7), and the three rows of the grooves 5 are formed in parallel to a width direction of the bracket member 1. FIG. 1C shows a state that the facing surfaces 4, 4 of the pair of bracket members 1, 1 are set in a close contact state, and grasping holes for accommodating, grasping, and fixing the cable (actually the cable of a part to which the intermediate member 3 (see FIG. 2) is crimped and tightened), are formed between the facing grooves 5 and 5 respectively. Further, projected portions 8 are formed on inner surfaces of the grooves 5 of the bracket members 1 having semi-circular sectional faces, along a circumferential direction of the grooves 5. The projected portions 8 are provided to each groove 5, at three places at specific intervals in a direction of the grooves 5.

Both ends of the bracket member 1 in a direction (arrangement direction of the cable) orthogonal to the direction of the groove 5 of the bracket member 1 are formed as attachment parts 14, 14 for attaching the cable to the cable attaching member such as a vehicle body. Bolts 7 (see FIG. 4 and FIG. 5) are provided to the attachment parts 14. The bolts 7 are tightening members for tightening the bracket members 1, 1 in a direction of a close contact between the facing surfaces 4, 4 of the bracket members 1, 1, and attaching and fixing the bracket members 1, 1 to cable attaching member 40 such as a vehicle body, etc. Insertion holes 15 for inserting the bolt 7 thereinto are formed on the attachment parts 14. Two insertion holes 15 are provided side by side in a width direction (direction of the grooves 5) of the bracket members 1, 1. Each attachment part 14 is formed into a flat plate shape, and a center of the bracket member 1 having the groove 5 formed thereon, is formed thicker than the attachment part 14.

FIG. 2 shows the intermediate member in the cable fixing member according to this embodiment. FIG. 2A is a front view of the intermediate member, and FIG. 2B shows a state that the intermediate member is crimped and tightened to the cable.

As shown in FIG. 2A, intermediate member 3 has insertion hole 12 into which the cable is inserted, and is a metal cylindrical member tightened to the cable by being crimped. As shown in FIG. 2B, after the cables 30 are inserted into the insertion hole 12, the intermediate member 3 is crimped by using a crimping tool (not shown) and is firmly tightened to the cables 30. In this embodiment, ring-shaped crimping parts 3a crimped and recessed at three parts of the intermediate member 3, are formed so as to correspond to the projected portions 8 formed at three places of the groove 5 of the bracket member 1.

Next, the procedure of attaching and fixing the cable to the cable attaching member by the cable fixing member of this embodiment, will be described by using FIG. 3 and FIG. 4. FIG. 5 is an expanded sectional view of FIG. 4 taken along the line A-A, and FIG. 6 is an expanded sectional view of FIG. 4 taken along the line B-B.

First, as shown in FIG. 3, intermediate members 3 are mounted on specified positions of the three cables 30 which are grasped and fixed collectively by the cable fixing member of this embodiment, and thereafter as described above, the intermediate members 3 are crimped by the crimping tool and are tightened to the cables 30.

Figure 4:
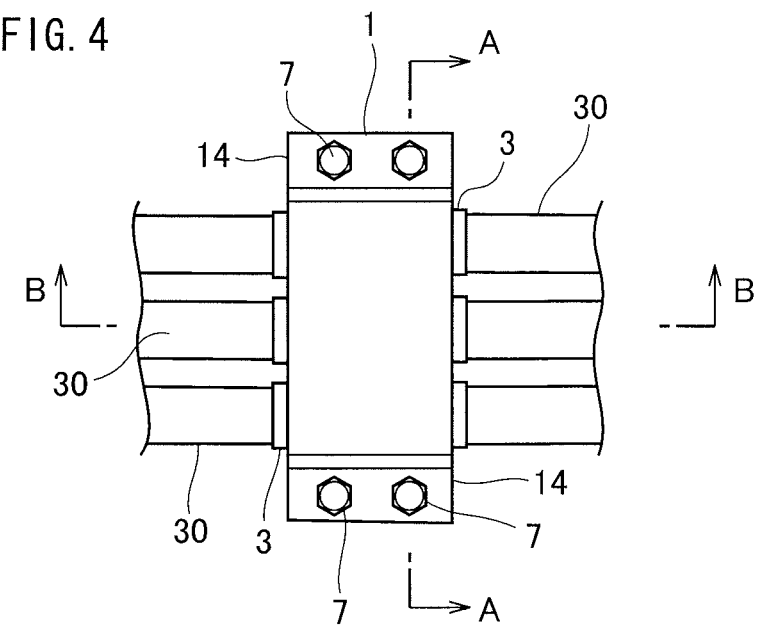
FIG. 4 is a view showing one of the procedures of fixing the cable by using the cable fixing member according to the embodiment 1 of the present invention.
Figure 5:
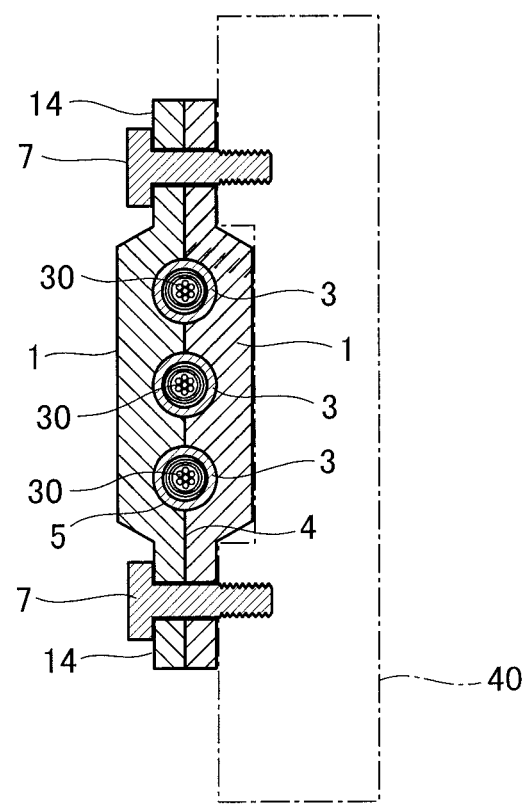
FIG. 5 is an expanded sectional view of FIG. 4 taken along the line A-A.

Subsequently, as shown in FIG. 3 and FIG. 4, the intermediate members 3 tightened to each outer periphery of three cables 30 is clamped from both sides, between three facing grooves 5 and 5 of the pair of bracket members 1 and 1. Thereafter, the bolts 7 are inserted into the facing insertion holes 15, 15 of the bracket members 1, 1, and as shown in FIG. 5, the bolts 7 are tightened and fixed to the cable attaching member 40 such as a vehicle body. Thus, the bracket members 1, 1 are fixed to the cable attaching member 40, with the facing surfaces 4 and 4 of the bracket members 1 and 1 formed in a tight or close contact state, and the cables 30 are grasped and fixed between the facing grooves 5 and 5 of the bracket members 1 and 1, through the intermediate members 3.

Figure 6:
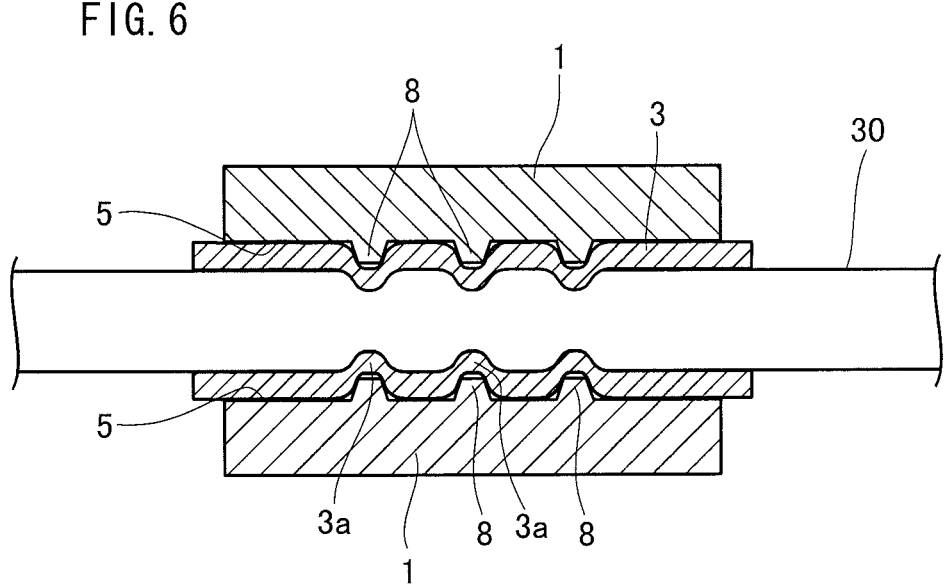
FIG. 6 is an expanded sectional view of FIG. 4 taken along the line B-B.

Further, when the intermediate members 3 crimped and tightened to the cables 30 are clamped and grasped between the grooves 5 and 5 of the pair of bracket members 1 and 1, as shown in FIG. 6, the projected portions 8 of the grooves 5 are meshed with depressed portions of the ring-shaped and recessed crimping parts 3a of the intermediate members 3. Accordingly, a positional deviation of the cable 30 in an axial direction can be prevented, by such an engagement structure between the projected portions 8 of the grooves 5 and the depressed portions on outer surfaces of the crimping parts 3a of the intermediate members 3.

Note that by grasping the intermediate member 3 by the bracket members 1 and 1, it may be possible to suppress the twist of the cable (rotation around an axis) caused by a friction generated on a contact surface between the groove 5 of the bracket member 1 and the intermediate member 3. Further, if the crimping parts 3a of the intermediate member 3 are not formed to be continued along a peripheral direction with a ring-shape respectively as described above, and for example, discontinuous depressed portions are formed by crimping at least at a part of the intermediate member 3, so that the protrusions of the grooves 5 are meshed with the depressed portions, the movement of the cable including the twist of the cable (rotation around the axis) can be suppressed or inhibited.

Figure 7:
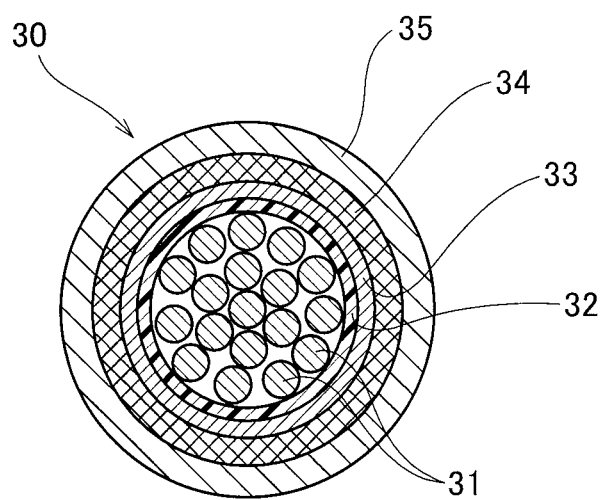
FIG. 7 is a cross-sectional view of a cable used in the cable fixing structure according to an embodiment of the present invention.

FIG. 7 shows a cross-sectional view of an embodiment of the cable 30 held and fixed to the vehicle body, etc. As shown in FIG. 7, the cable 30 has a circular cross sectional shape, having a plurality of twisted conductors 31 in the center, and the outer periphery of the conductors 31 are sequentially coated with insulator 32, shield 33, reinforcing braid 34, and sheath 34 in a concentric manner. The reinforcing braid 34 is formed by braiding a fabric material such as resin and metal. Since the reinforcing braid 34 is provided to the outer peripheral part of the cable 30, the crimping parts 3a are effectively entered into the cable 30 when the intermediate member 3 is crimped, thus firmly fixing the intermediate member 3 to the cable 30, and suppressing an adverse influence on a cable structure (conductor 31, insulator 32, and shield 33) inside of the reinforcing braid 34 caused by crimping, etc.

Note that as a matter of course, the cable to which the present invention is applied, is not limited to the cable 30 of the aforementioned embodiment shown in FIG. 7, and includes electric wire, etc. Specifically, the cable of the present invention includes a cable having electric power line for supplying electric power, a cable having a signal line for transmitting a signal, and a cable having the electric power line and the signal line. Further, the present invention is not limited to the cable for automobiles, and can be suitably used for the cable used under an environment receiving violent vibration, etc. Further, the cable may have a rectangular sectional face, instead of the circular sectional shape.

According to embodiment 1, one or a plurality of effects as shown below can be obtained.

(1) The cable 30 can be fixed with a sufficient grasping force, by having a structure that the intermediate member 3 is crimped and firmly attached to the cable 30, and the cable 30 is clamped and grasped between the bracket members 1 and 1 through the intermediate member 3. Particularly, the projected portions 8 of the grooves 5 are meshed with the depressed portions of the crimping parts 3a of the intermediate members 3, and therefore even if an excessive tensile force is added to the cable 30, the cable can be held by the engagement structure of the projected portions 8 of the grooves 5 and the depressed portions of the crimping parts 3a, thus making it possible to prevent the deviation of the cable 30 as much as possible. Particularly, foreign matters such as mud and snow are adhered to the cable provided under a vehicle spring, and the cable with foreign matters adhered thereto are sometimes bent or vibrated, and at this time, the excessive tensile force is generated in the cable. However, in such a case as well, the cable can be sufficiently fixed and held.

(2) By having a structure that the cable 30 is clamped and held by the bracket members 1 and 1 through the intermediate members 3, the grasping force of the bracket members 1 and 1 applied to the cable 30 is equalized by the intermediate members 3, and therefore even if a great force is added to the cable 30, an unintended force is not added locally to the cable 30 of the cable fixing part, thus making it possible to prevent the deviation of the layout position of the cable and prevent the generation of troubles such as disconnection as a result.

(3) By having a structure that the intermediate member 3 crimped and tightened to the cable 30, is clamped by the bracket members 1 and 1, to thereby grasp the cables 30 by tightening it by tightening members (bolts 7), the twist of the cable 30 can be corrected if tightening of the bracket members 1 and 1 by the tightening members is loosened during attaching and fixing the cable. Therefore, when the cable is attached, slight adjustment such as correcting the twist of the cable 30 is also possible, and therefore accuracy of assembling the cable 30 into the vehicle body, etc., is improved, and the layout of the cable can be made as designed.

(4) By having a simple structure that the intermediate member 3 crimped and tightened to the cable 30 is clamped by the bracket members 1 and 1 to thereby grasp the cable 30, reliability in an aspect of quality is high, and a cost can be suppressed, because a plurality of cables 30 can be collectively fixed.

Other Embodiment

Note that although the bracket member 1 of the aforementioned embodiment 1 grasps and fixes three cables 30, the bracket member having a plurality of grooves other than one or three grooves may also be used. However, when the layout of the plurality of cables is made, it is preferable that a plurality of cables are collectively grasped and fixed by the bracket members for a plurality of cables, from an aspect of workability and securing a fixing place.

Further, in the bracket member 1 of the embodiment 1, at least one of the attachment parts 14 and 14 may be formed in such a manner as being bent to the center of the bracket member 1 having the groove 5 for grasping the cable. Bending of the attachment part is sometimes suitable, from a viewpoint of an installation space or workability at the time of installing and fixing the cable to a narrow place. Further, when the attachment part is bent, preferably a rib is provided on a surface of the opposite side to the facing surface of the bracket member, or the attachment part is made thick.

Further, according to the embodiment 1, as shown in FIG. 5, the attachment parts 14, 14 at both sides of the bracket member 1 are tightened and fixed to the cable attaching member 40 by the bolts 7. However, simply inter-bracket members 1 and 1 may be tightened, instead of fixing one of the attachment parts 14 to the cable attaching member 40.

Embodiment 2-1

Figure 8A:
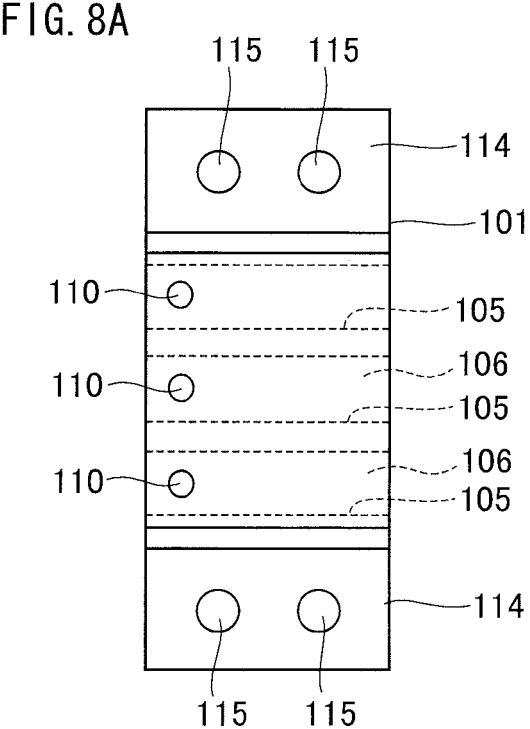
FIG. 8A is a front view showing a pair of bracket members in a cable fixing member according to embodiment 2-1 of the present invention.
Figure 8B:
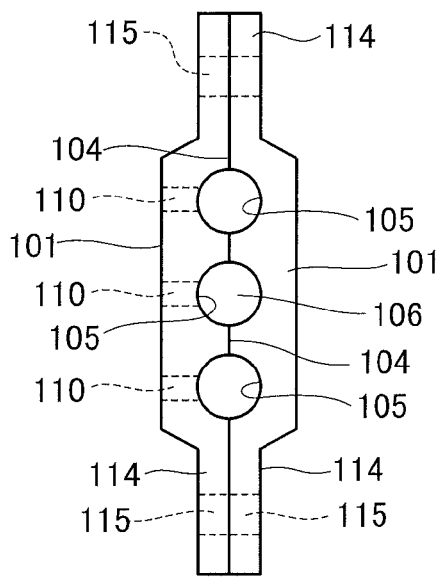
FIG. 8B is a side view showing a pair of bracket members in the cable fixing member according to the embodiment 2-1 of the present invention.
Figure 9:
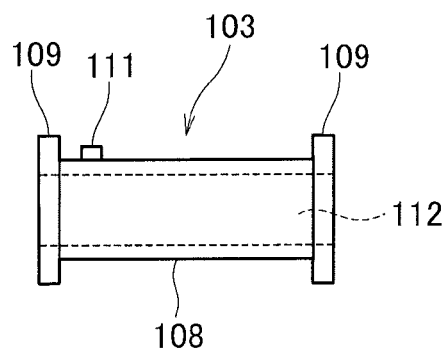
FIG. 9 is a front view showing an intermediate member in the cable fixing member according to the embodiment 2-1 of the present invention.

FIG. 8A and FIG. 8B show a pair of bracket members in the cable fixing member according to embodiment 2-1 of the present invention, wherein FIG. 8A is a front view and FIG. 8B is a side view. Further, FIG. 9 is a front view showing the intermediate member in the cable fixing member according to embodiment 2-1.

Figure 11:
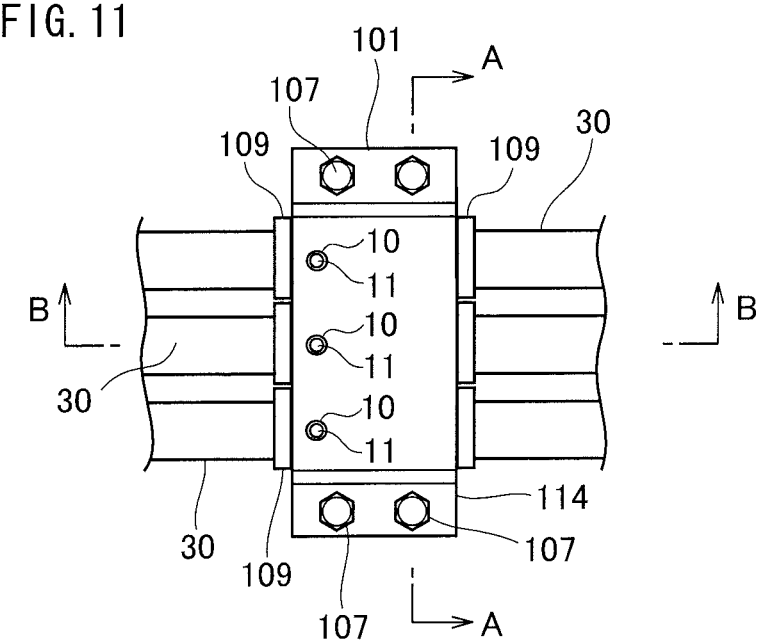
FIG. 11 is a view showing one of the procedures of fixing the cable by using the cable fixing member according to the embodiment 2-1 of the present invention.

As shown in FIG. 8A and FIG. 8B, a pair of bracket members 101 and 101 of this embodiment are used for grasping three cables and fixing them to the vehicle body, etc., and three rows of grooves 5 for grasping the cable are formed on facing surfaces 104 of the bracket members 101. The cross-sectional face of the respective grooves 105 is formed into a semi-circular shape so as to correspond to the circular sectional shape of the cable, and the outer periphery of the cable is clamped and held from both sides by the grooves 105 and 105 of a pair of bracket members 101 and 101. The three rows of the grooves 105 are formed in parallel to the width direction of the bracket members 1. FIG. 11 shows a state that the pair of bracket members 101 and 101 are meshed with each other, to thereby set the facing surfaces 104 and 104 in a close contact state, and grasping hole 106 for accommodating, grasping, and fixing the cable (actually the cable of a part to which the intermediate member 103 (see FIG. 2) is crimped and tightened), is formed between the facing grooves 105 and 105.

Both ends of the bracket members 101 in a direction (arrangement direction of the cable) orthogonal to the direction of the grooves 105 of the bracket members 101 are formed as attachment parts 114, 114 for attaching the cable to the cable attaching member such as a vehicle body. Bolts 107 are provided (see FIG. 11 and FIG. 12A) as tightening members for attaching and fixing the bracket members 101, 101 to the cable attaching member 40 such as the vehicle body. Insertion holes 115 for inserting the bolts 7 are formed on the attachment parts 114. Two insertion holes 115 are provided side by side in the width direction of the bracket members 101 and 101 (direction of the grooves 105). The attachment part 114 is formed into a flat plate shape, and the center of the bracket member 101 with the groove 105 formed thereon, is formed thicker than the attachment part 114.

Circular holes 110 are formed on three grooves 105 of one of the bracket members 101, and the holes 110 are not formed on the other bracket member 101. Hole 110 formed in each groove 105 of one of the bracket members 101 is provided to a place close to one of the side faces of the bracket member 101 in the width direction. Further, the holes 110 are formed to protrude from the grooves 105 to a surface of the opposite side of the facing surface 104 of the bracket member 101.

The intermediate member 3 of this embodiment is made of metal, and as shown in FIG. 9, has insertion hole 112 into which the cable is inserted, and has cylindrical part 108 tightened to the cable by being crimped and stopper parts (protrusions) 109 formed at both ends of the cylindrical part 108 so as to protrude in a flange shape in a diameter direction. A length between stopper parts 109 and 109 is set to the same as a width between the bracket members 101 and 101 in a direction of the grooves 105. Accordingly, when the cylindrical part 108 tightened to the cable 30 is clamped by a pair of bracket members 101 and 101, side faces of the bracket members 101, 101 and the stopper parts 109 of the intermediate member 103 are set in a contact state.

Further, cylindrical protrusion 111 is formed at a place close to one of the stopper parts 109 on the outer peripheral part of the cylindrical part 108 so as to protrude from the outer peripheral surface of the cylindrical part 108. The protrusion 111 is formed so as to be accommodated in each hole 110 formed in each groove 105 of each bracket member 101, when clamping the cylindrical part 108 tightened to the cable by the pair of bracket members 101, 101. Accordingly, an attachment position and fixing position of the bracket member 101 to the cable, and particularly an attachment angle and a fixing angle of the bracket member 101 to the cable in a peripheral direction can be determined, by the engagement of the protrusion 111 of the cylindrical part 108 and the hole 110 of the bracket member 101.

Figure 10:
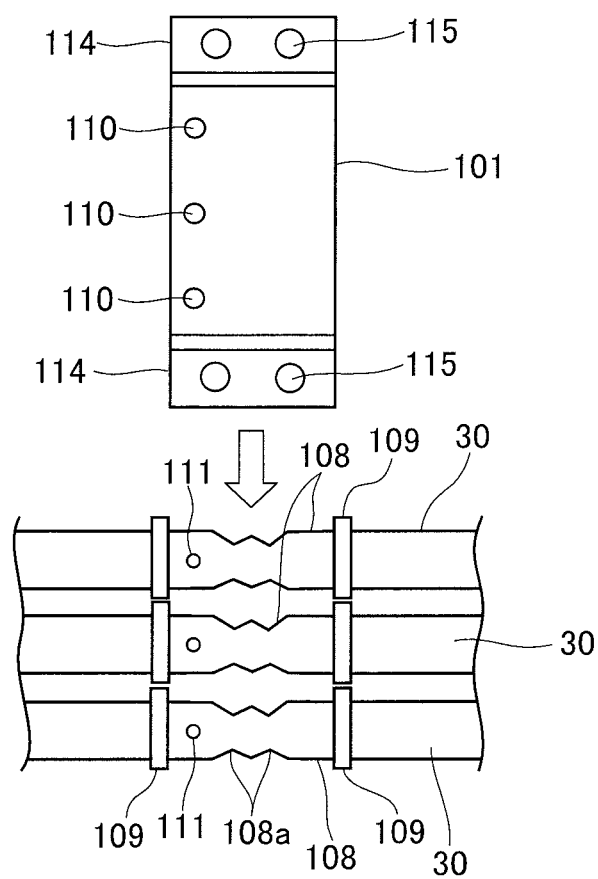
FIG. 10 is a view showing one of the procedures of fixing the cable by using the cable fixing member according to the embodiment 2-1 of the present invention.

Next, the procedure of attaching and fixing the cable to the cable attaching member by the cable fixing member of this embodiment, will be described by using FIG. 10, FIG. 11, FIG. 12A, and FIG. 12B. FIG. 10 and FIG. 11 are views showing the procedure of attaching and fixing the cable, and FIG. 12A is an expanded sectional view of FIG. 11 taken along the line A-A, and FIG. 12B is an expanded sectional view of FIG. 11 taken along the line B-B.

First, as shown in FIG. 10, the intermediate member 103 is fitted to a specified position of each of the three cables 30 which are collectively grasped and fixed by the cable fixing member of this embodiment, and thereafter the cylindrical part 108 of the intermediate member 103 is crimped by using a crimping tool (not shown), to thereby tighten the intermediate member 103 to the cable 30. In the figure, ring-shaped crimping parts 108a are formed to be recessed at two places of the cylindrical part 108.

Subsequently, as shown in FIG. 11, the cylindrical part 108 of the intermediate member 103 tightened to the outer periphery of the three cables 30 respectively, is clamped from both sides between three facing grooves 105 and 105 of the pair of bracket members 101 and 101. At this time, the hole 110 of the groove 105 of the bracket member 101 is adjusted to the protrusion 111 of the cylindrical part 108, and the protrusion 111 of the cylindrical part 108 is inserted into the hole 110 of the bracket member 101, to thereby easily position the attachment angle or fixing angle of the bracket members 101, 101 in the peripheral direction of the cable 30.

Figure 12A:
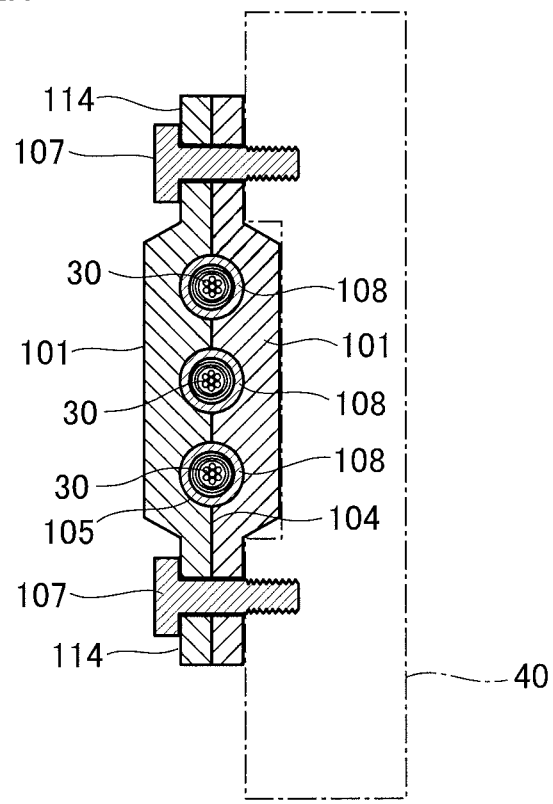
FIG. 12A is an expanded sectional view of FIG. 11 taken along the line A-A.
Figure 12B:
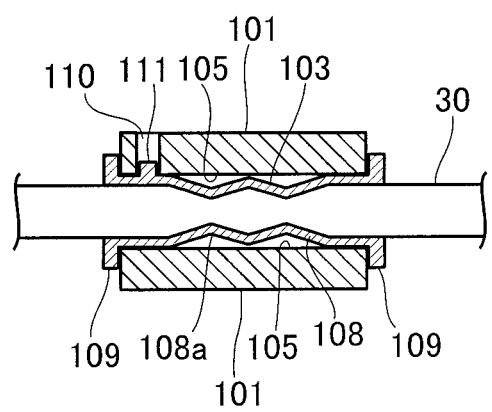
FIG. 12B is an expanded sectional view of FIG. 11 taken along the line B-B.

Thereafter, as shown in FIG. 11, the bolts 107 are inserted into the facing insertion holes 115 and 115 of the bracket members 101 and 101 positioned on the cable 30, and further as shown in FIG. 12A, the bolts 107 are tightened and fixed to the cable attaching member 40 such as a vehicle body. Thus, the bracket members 101, 101 are fixed to the cable attaching member 40, and the facing surfaces 104, 104 of the bracket members 101, 101 are set in a close contact state or a tight contact state, to thereby grasp and fix the cable 30 between the facing grooves 105 and 105 of the bracket members 101 and 101, through the intermediate member 103. At this time, as shown in FIG. 12B, both side faces of the bracket members 101, 101 are set in a contact state with the stoppers 109, 109 of the intermediate member 103, to thereby inhibit the movement of the bracket members 101, 101 in an axial direction of the cable 30 by the stoppers 109, 109 at both ends of the cylindrical part 108. Further, the protrusion 111 of the cylindrical part 108 is set in an insertion state into the hole 110 of the groove 105 of the bracket member 101, to thereby control or inhibit the rotation (twist) of the cable 30.

Figure 13:
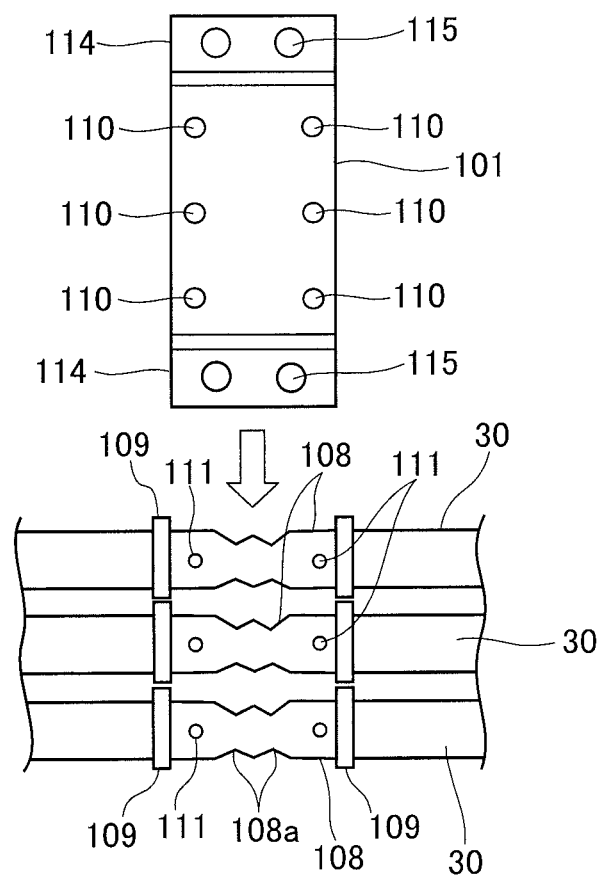
FIG. 13 is a view showing the cable fixing member according to other embodiment of the present invention.

Note that as shown in FIG. 8A, FIG. 8B, and FIG. 10, according to the embodiment 2-1, the holes 110 are provided on one of the side faces of the bracket members 101. However, as shown in FIG. 13, the holes 110 may also be provided on both sides of the bracket members 101 in the width direction. In this case, as shown in FIG. 13, protrusions 111 are provided on both sides of the cylindrical part 108 of the intermediate member 103, so as to correspond to the holes 110 on both sides of the bracket members 101 in the width direction. Further, according to the embodiment 2-1, the holes 110 are formed on one of the bracket members 101, and the holes 110 are not formed on the other bracket member 101. However, the holes 110 may also be formed on both of the pair of bracket members 101 and 101. In this case, a plurality of protrusions 111 are provided on the outer peripheral part of the cylindrical part 108, for example in an arrangement of 180 degree in the peripheral direction of the cylindrical part 108. Further, although the bracket member 101 of the embodiment 2-1 grasps and fixes three cables 30, the bracket member having a plurality of grooves other than one or three may also be used.

According to the embodiment 2-1, one or a plurality of effects as shown below can be obtained.

(1) It may be possible to easily and surely determine the attachment angle of the bracket members 101 and 101 in the peripheral direction of the cable 30, and the attachment position of the bracket members 101, 101 in the axial direction of the cable 30, by the engagement of the protrusions 111 of the cylindrical parts 108 and the holes 110 of the bracket members 101. Accordingly, accuracy of assembling the cable 30 into the vehicle body, etc., can be improved, and the layout of the cable as designed is possible. Further, since the protrusions 111 of the cylindrical parts 108 are inserted into the holes 110 of the grooves 105 of the bracket members 101, the movement of the cable 30 due to the twist (rotation) can be inhibited or suppressed, and as a result, it may be possible to reduce a possibility of disconnection by contact of the peripheral components and the cable.

(2) Since the intermediate member 103 is crimped and firmly fixed to the cable 30, and the cable 30 is clamped and grasped by the bracket members 101, 101 through the intermediate member 103, the cable 30 can be fixed with a sufficient grasping force. Particularly, since the stoppers 109, 109 are provided at both ends of the cylindrical part 108 of the intermediate member 103, the force added to the cables 30 can be received by the stoppers 109, even if an excessively great tensile force is added to the cable 30, and the deviation of the cable 30 can be prevented as much as possible. Particularly, foreign matters such as mud and snow are adhered to the cable provided under the vehicle spring, and the cable with the foreign matters adhered thereto, is sometimes bent or vibrated. At this time, although the excessively great tensile force is generated in the cable, in this case as well, the cable can be fixed and held sufficiently.

(3) Since the cable 30 is clamped and grasped by the bracket members 101, 101 through the intermediate member 103, the grasping force of the bracket members 101, 101 added to the cable 30 is equalized. Therefore, even if the great force is added to the cable 30, unintended force is not locally added to the cable 30 of the cable fixing part, and therefore a layout position of the cable is not deviated, thus making it possible to prevent the generation of troubles such as disconnection as a result.

(4) Since simply the intermediate member 103 crimped and tightened to the cable 30 is clamped by the bracket members 101, 101, to thereby grasp the cables 30, reliability in an aspect of quality is high, and the cost can be suppressed, because a plurality of cables 30 can be collectively fixed.

Embodiment 2-2

Figure 14:
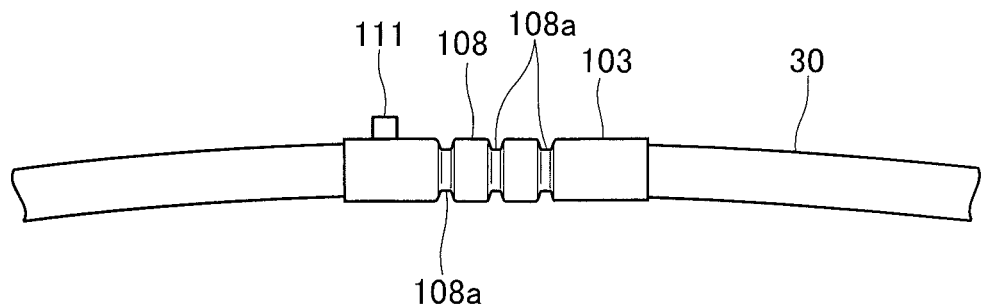
FIG. 14 is a view showing a state that the intermediate member in the cable fixing member according to embodiment 2-2 of the present invention is crimped and tightened to the cable.
Figure 15A:
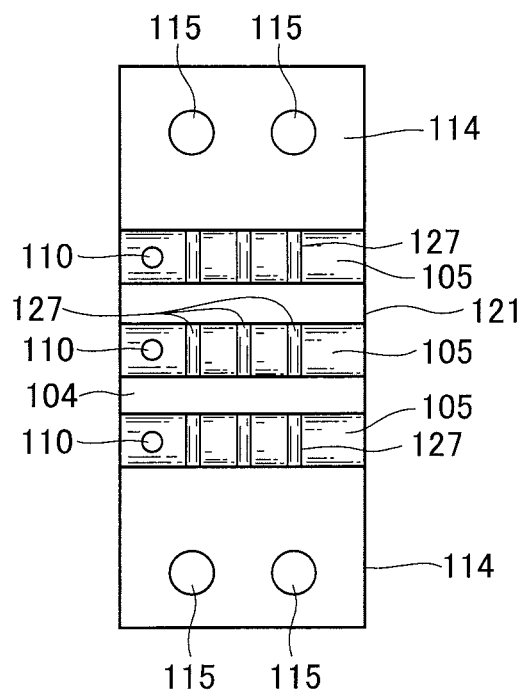
FIG. 15 is a view showing a facing surface side of a pair of bracket members in the cable fixing member according to the embodiment 2-2 of the present invention.
Figure 15B:
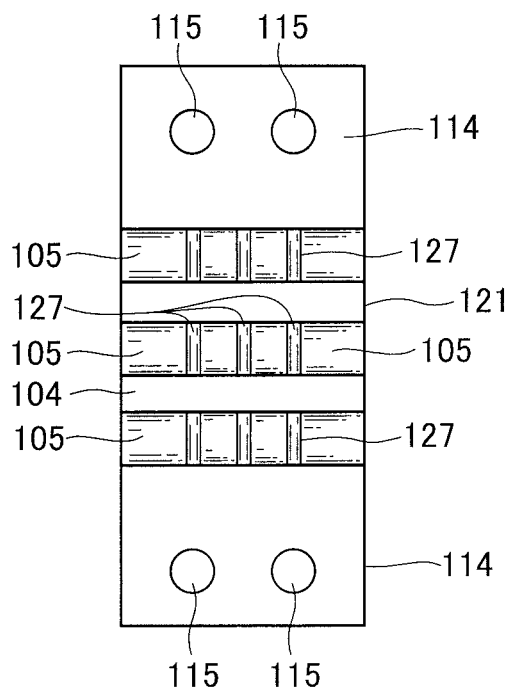

FIG. 14 is a view showing a state that the intermediate member in the cable fixing member according to embodiment 2-2 of the present invention is crimped and tightened to the cable. Further, FIG. 15A and FIG. 15B are views showing the facing surface side of the pair of bracket members in the cable fixing member according to the embodiment 2-2, respectively. The cable fixing member according to the embodiment 2-2 is also used for grasping three cables and fixing them to the vehicle body, etc., and different points from the cable fixing member according to the embodiment 2-1 will be described hereafter.

The stopper parts 109 of the embodiment 2-1 are omitted in the intermediate member 103 of the embodiment 2-2. Namely, as shown in FIG. 14, the intermediate member 103 of this embodiment is composed of the cylindrical part 108. The cylindrical protrusion 111 is provided at one of the end part sides on the outer peripheral surface of the cylindrical part 108 in the axial direction. The center of the cylindrical part 108 is crimped at three places and is tightened to the cable 30.

Inner surface shapes of the grooves 5 of the pair of bracket members 121, 121 of this embodiment are formed to engage with outer surface shapes of the cylindrical parts 108 having, so as to correspond to the outer surface shapes of the cylindrical parts 108 having the crimped parts 108a formed to be recessed in ring shapes at three places. Namely, as shown in FIG. 15, projected portions 127 along the peripheral direction of the grooves 105 are formed on the inner surfaces of the grooves 105 of the bracket members 121, 121 at three places in a direction of the grooves 105, so as to correspond to the crimping parts 108a formed to be recessed in ring shapes. Further, as shown in FIG. 15A, circular holes 110 are formed on the three grooves 105 of one of the bracket members 121, 121, so as to correspond to the protrusions 111 of the cylindrical parts 108.

Figure 16:
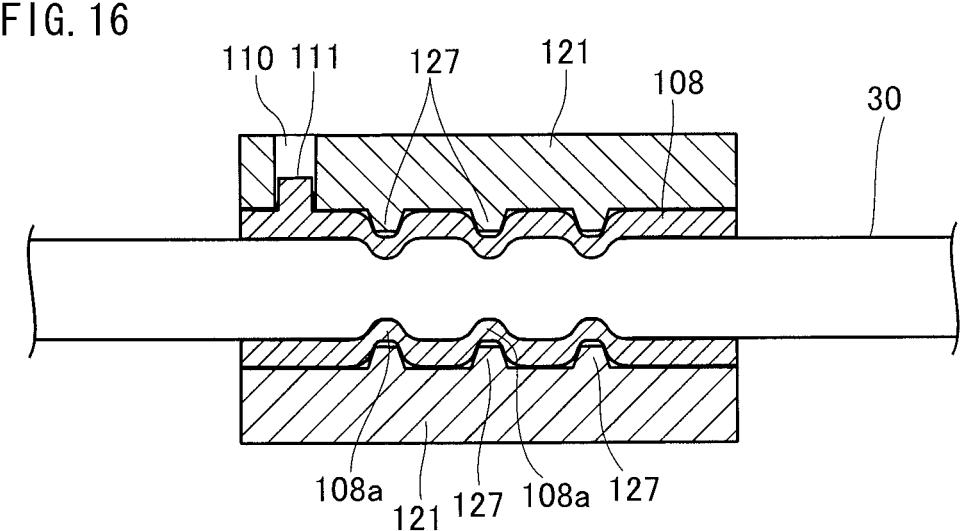
FIG. 16 is a sectional view of a state that the cable fixing member according to the embodiment 2-2 of the present invention is fixed to the cable.

When the cylindrical parts 108 of the intermediate member 103 crimped and tightened to the cable 30 are clamped and grasped between the grooves 105 and 105 of a pair of bracket members 121 and 121, as shown in FIG. 16, projected portions 127 of the grooves 105 are meshed with depressed portions of the outer surfaces of the crimping parts 108a of the cylindrical parts 108. Namely, in this embodiment, the positional deviation of the cable 30 in the axial direction is inhibited, by the engagement structure of the projected portions 127 and the crimping parts 108a.

Further, when the cylindrical parts 108 are clamped between the grooves 105 and 105 of the pair of bracket members 121 and 121, the attachment angle and the fixing angle of the bracket members 121, 121 in the peripheral direction of the cable 30 can be easily determined by inserting the protrusion 111 of the cylindrical part 108 into the hole 110 of the bracket member 101. Further, the rotation (twist) of the cable 30 can be controlled or inhibited by inserting the protrusion 111 of the cylindrical part 108 into the hole 110 of the groove 105 of the bracket member 101.

Embodiment 2-3

Figure 17:
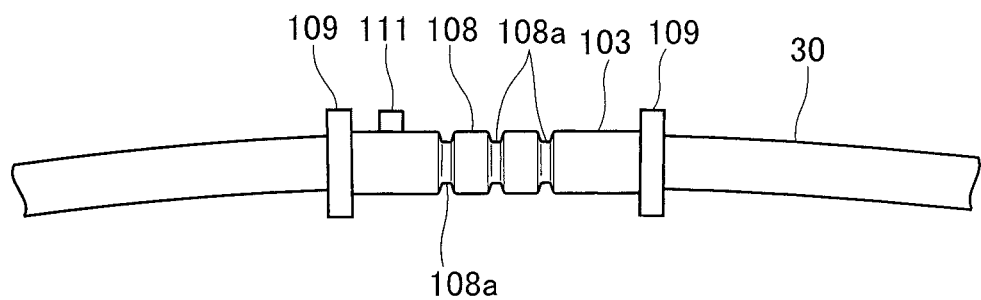
FIG. 17 is a view showing a state that the intermediate member in the cable fixing member according to embodiment 2-3 of the present invention is crimped and tightened to the cable.
Figure 18:
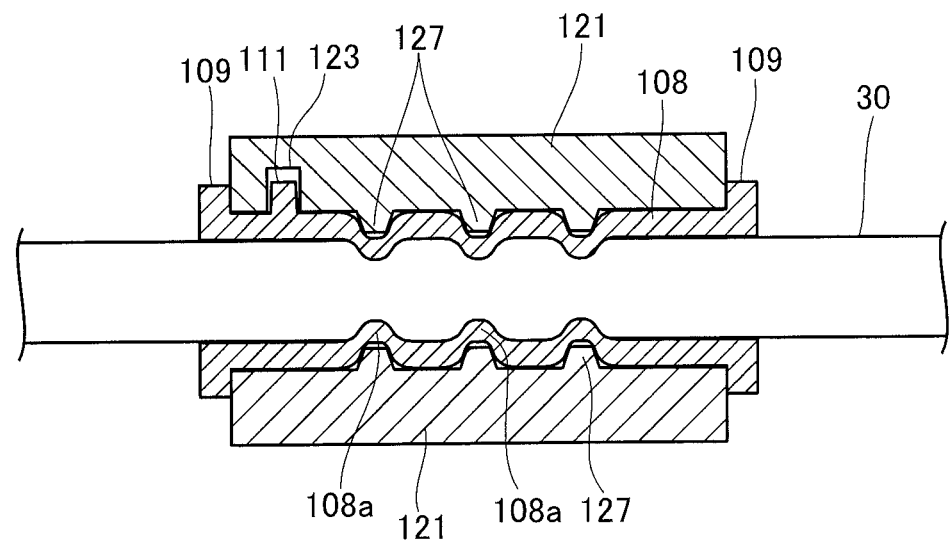
FIG. 18 is a sectional view of a state that the cable fixing member according to the embodiment 2-3 of the present invention is fixed to the cable.

FIG. 17 is a view showing a state that the intermediate member in the cable fixing member according to embodiment 2-3 of the present invention, is crimped and tightened to the cable, and FIG. 18 is a sectional view of a state that the cable fixing member according to the embodiment 2-3 is fixed to the cable.

As shown in FIG. 17, the intermediate member 103 of this embodiment has the stopper parts 109 at both ends of the cylindrical part 108 similarly to the aforementioned embodiment 2-1, and the protrusion 111 is formed on the outer peripheral surface of the cylindrical part 108. The cylindrical part 108 of the intermediate member 103 is crimped at three places and is attached to the cable 30.

Further, similarly to the aforementioned embodiment 2-2, projected portions 127 along the peripheral direction of the grooves 105 are formed at three places in the direction of the grooves 105 of the pair of bracket members 121, 121, so as to correspond to the crimping parts 108a formed to be recessed in ring shapes. Therefore, when the cylindrical part 108 of the intermediate member 103 crimped and tightened to the cable 30, is clamped and grasped between the grooves 105 and 105 of the pair of bracket members 121, 121, as shown in FIG. 18, the projected portions 127 of the grooves 105 are meshed with the depressed portions on the outer surface of the crimping parts 108a of the cylindrical part 108. Accordingly, in this embodiment, the positional deviation of the cable 30 in the axial direction can be further strongly inhibited, by the engagement structure of the projected portions 127 of the grooves 105 and the depressed portions on the outer surface of the crimping parts 108a, in addition to the structure of the stopper parts 109.

Further, as shown in FIG. 18, hole 123 having a circular sectional face is formed in the three grooves 105 of one of the bracket members 121, so as to correspond to the protrusion 111 of the cylindrical part 108. In this embodiment as well, when the cylindrical part 108 is clamped by the pair of bracket members 121 and 121, the attachment angle and the fixing angle of the bracket members 121, 121 in the peripheral direction of the cable 30, can be easily positioned by inserting the protrusion 111 of the cylindrical part 108 into the hole 123 of the bracket member 101. Further, the rotation (twist) of the cable 30 can be controlled or inhibited, by inserting the protrusion 111 of the cylindrical part 108 into the hole 123 of the grooves 105 of the bracket member 121. Note that the hole 110 of the bracket members 101 and 121 of the aforementioned embodiment is protruded from the grooves 105 to the surface of the opposite side to the facing surfaces of the bracket members 101, 121. However, the hole 123 of this embodiment is formed into not a through hole but a depressed portion.

Other Embodiment

Note that although holes 110 and 123 of the bracket members 101 and 121 of the aforementioned embodiments 2-1 to 2-3 are formed into circular shapes, they may be formed into rectangular shapes of course, and the protrusions 111 of the intermediate member 103 inserted into the holes 110 and 123 of the bracket members 101 and 121 may be formed into not cylindrical shapes but prismatic shapes. Further, the attachment angle and the fixing angle of the bracket members to the intermediate member may be determined by making the holes of bracket members larger than the protrusions of the intermediate member, and making the side faces of the protrusions of the intermediate member brought into contact with the inner surface of the holes of the bracket members.

Further, in the bracket members 101 and 121 of the embodiments 2-1 to 2-3, at least one of the attachment parts 114 and 114 is formed to be bent to the center for grasping the cable. Bending of the attachment part is sometimes suitable from the viewpoint of the installation space and workability, when the cable is installed or fixed to a narrow place. Further, when the attachment part is bent, the attachment part is preferably made thick for improving the strength of the bracket members, or a rib may be provided on the surface on the opposite side of the facing surfaces of the bracket members.

Further, in the aforementioned embodiment 2-1, as shown in FIG. 12A, the attachment parts 114, 114 at both sides of the bracket members 101 are tightened and fixed to the cable attaching member 40 by the bolts 107. However, a pair of bracket members 101 and 101 may be tightened to each other, instead of fixing one of the attachment parts 114 is fixed to the cable attaching member 40.

Embodiment 3-1

Figure 19A:
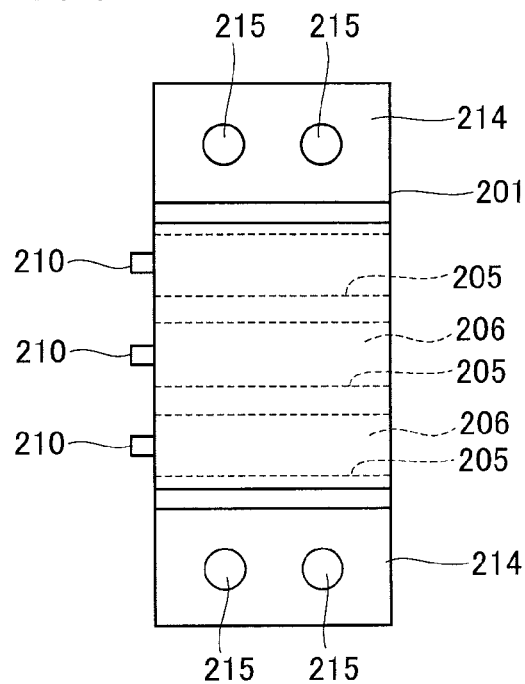
FIG. 19A is a front view showing a pair of bracket members in the cable fixing member according embodiment 3-1 of the present invention.
Figure 19B:
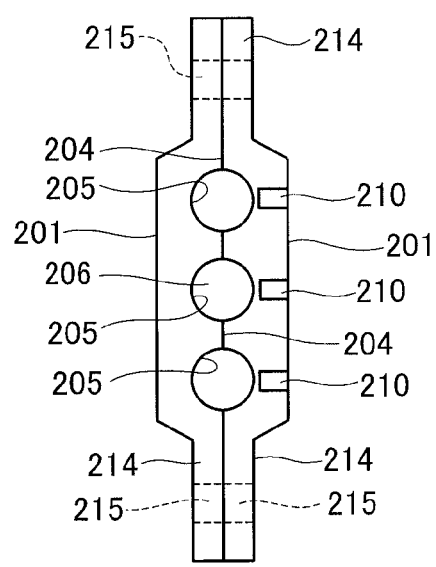
FIG. 19B is a side view showing a pair of bracket members in the cable fixing member according to the embodiment 3-1 of the present invention.
Figure 20:
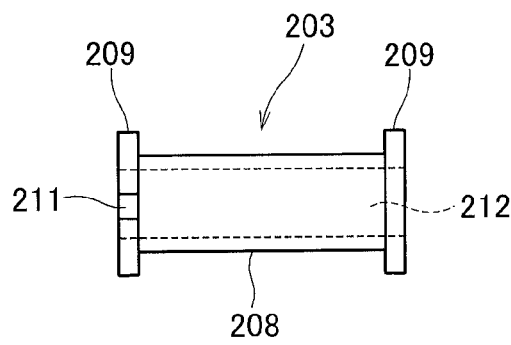
FIG. 20 is a front view showing the intermediate member in the cable fixing member according to the embodiment 3-1 of the present invention.

FIG. 19A and FIG. 19B show a pair of bracket members in the cable fixing member according to embodiment 3-1 of the present invention, wherein FIG. 19A is a front view, and FIG. 19B is a side view. Further, FIG. 20 is a front view showing the intermediate member in the cable fixing member according to the embodiment 3-1.

As shown in FIG. 19A and FIG. 19B, a pair of bracket members 201, 201 of this embodiment are used for grasping three cables and fixing them to a vehicle body, etc., and three rows of grooves 205 for clamping and grasping the cable are formed on facing surfaces 204 of the bracket members 201. A cross-sectional face of each groove 205 is formed into a semi-circular shape so as to correspond to the circular sectional face of the cable, and the outer periphery of the cable is clamped and grasped from both sides between the grooves 205, 205 of the pair of bracket members 201, 201. Three rows of grooves 205 are formed in parallel to each other in the width direction of the bracket members 201. FIG. 19A and FIG. 19B show a state that the pair of bracket members 201, 201 are meshed with each other, and the facing surfaces 204, 204 of them are set in a close contact state, wherein grasping holes 206 for accommodating, grasping, and fixing the cable (actually, the cable of a part to which the intermediate member 203 is crimped and tightened (see FIG. 20)) are formed between the facing grooves 205 and 205.

Attachment parts 214, 214 for attaching the cable to the cable attaching member such as a vehicle body are formed on both ends in a direction orthogonal to the direction of the grooves 205 of the bracket members 201 (cable arrangement direction). Bolts 207 (see FIG. 22, FIG. 23A, and FIG. 23B), being tightening members for tightening the facing surfaces 204, 204 of the pair of bracket members 201, 201 in a direction of a tight contact, and attaching and fixing the bracket members 201, 201 to the cable attaching member 40 such as a vehicle body, are provided to the attachment parts 214. Insertion holes 215 for inserting the bolts 207 are formed on the attachment parts 214. Two insertion holes 215 are provided side by side in the width direction (direction of the grooves 205) of the bracket members 201, 201. The attachment parts 124 are formed into flat plate shapes and the center of the bracket members 201 having the grooves 205 formed therein are formed to be thicker than the attachment parts 214.

Protrusion 210 is provided to one of the bracket members 201. The protrusion 210 is formed into a prismatic shape for example as shown in the figure, and is formed on one side face of the bracket members 201 in the width direction (direction of the grooves 205) so as to face each groove 205.

The intermediate member 203 of this embodiment is made of metal, and as shown in FIG. 20, comprising: insertion hole 212 into which the cable is inserted; cylindrical part 208 tightened to the cable by being crimped; and stopper parts (protrusions) 209 formed on both ends of the cylindrical part 208 in a flange shape in a diameter direction. A length between the stopper parts 209 and 209 are set to be same as a width between the bracket members 201 and 201. Accordingly, when the cylindrical part 208 tightened to the cable 30 is clamped by the pair of bracket members 201, 201, the side faces of the bracket members 201, 201 and the stopper parts 209 of the intermediate member 203 are set in a contact state.

However, protrusions 210 are formed to protrude in the direction of the grooves 205 from the side faces of the bracket members 201, and notches (notch grooves) 211 into which the protrusions 210 are inserted, are formed on the stopper parts 209 of the intermediate member 203. The attachment position and the fixing position of the bracket members 201 to the cable, particularly the attachment position and the fixing position of the bracket members 201 in the peripheral direction of the cable, can be determined by engagement of the protrusions 210 and the notches 211.

Figure 21:
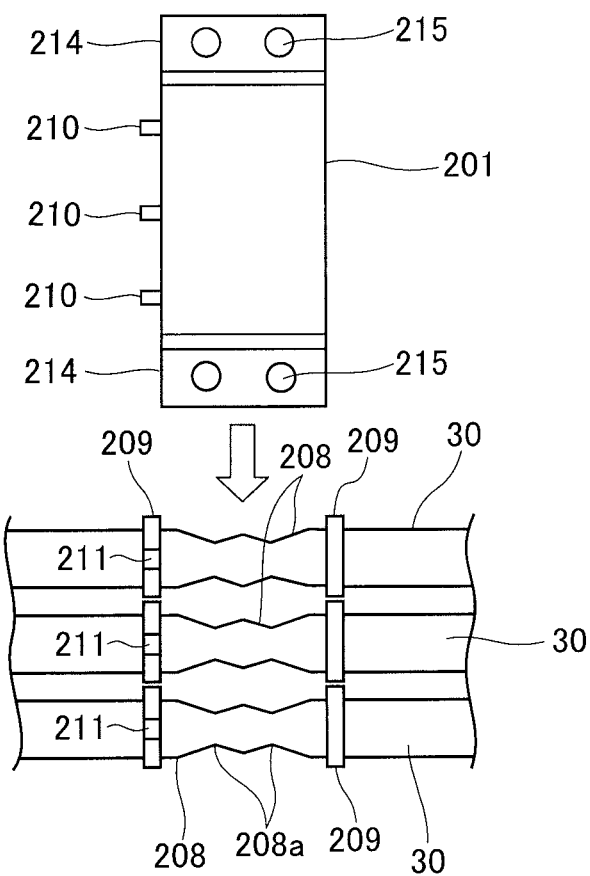
FIG. 21 is a view showing one of the procedures of fixing the cable by using the cable fixing member according to the embodiment 3-1 of the present invention.
Figure 22:
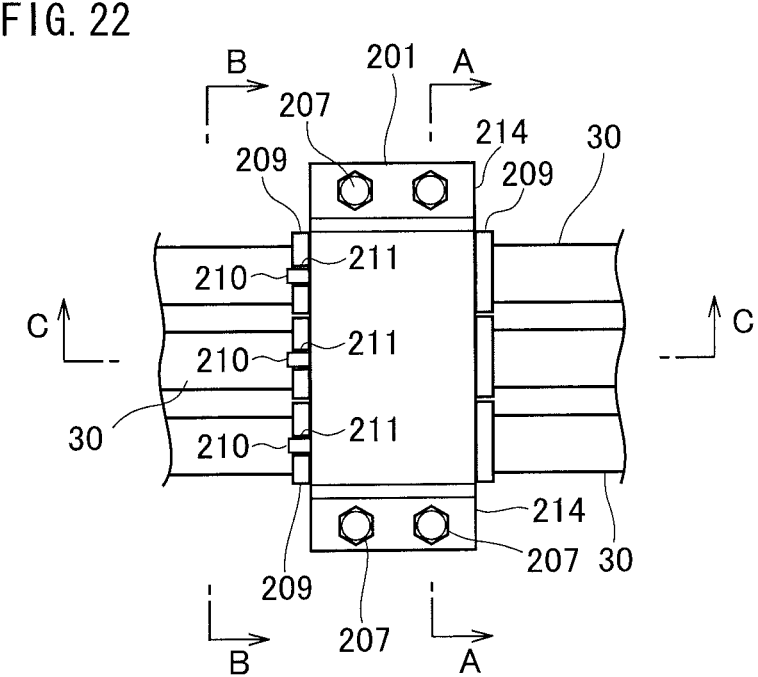
FIG. 22 is a view showing one of the procedures of fixing the cable by using the cable fixing member according to the embodiment 3-1 of the present invention.

Next, the procedure of attaching and fixing the cable to the cable attaching member by the cable fixing member according to this embodiment, will be described by using FIG. 21 to FIG. 23C. FIG. 21 and FIG. 22 are views showing the procedure of attaching and fixing the cables, and FIG. 23A is an expanded sectional view of FIG. 22 taken along the line A-A, FIG. 23B is an expanded sectional view of FIG. 22 taken along the line B-B, and FIG. 23C is an expanded sectional view of FIG. 22 taken along the line C-C.

First, as shown in FIG. 21, after the intermediate member 203 is fitted to a specified position of each one of the three cables 30 which are collectively grasped and fixed by the cable fixing member of this embodiment, the cylindrical part 208 of the intermediate member 203 is crimped by using the tightening tool (not shown), to thereby tighten the intermediate member 203 to the cables 30. In the figure, ring-shaped crimping parts 208a are formed at two places of the cylindrical part 208 so as to be recessed.

Subsequently, as shown in FIG. 22, the cylindrical part 208 of the intermediate member 203 tightened to the outer periphery of the three cables 30 respectively, is clamped from both sides between three facing grooves 205 and 205 of the pair of bracket members 201, 201. At this time, the protrusions 210 of the bracket members 201 are adjusted to the notches 211 of the stopper parts 209, so that the protrusions 210 can be inserted into the notches 211, to thereby easily install the bracket members 201, 201 in the peripheral direction of the cable 30 at designed attachment angle and fixing angle.

Figure 23A:
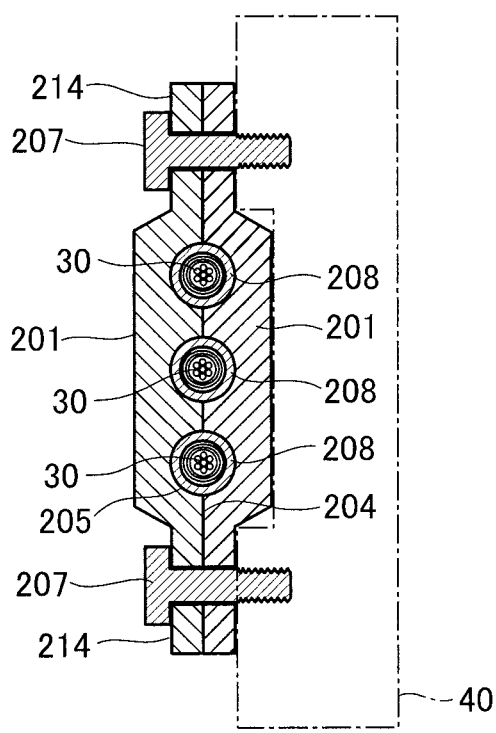
FIG. 23A is an expanded sectional view of FIG. 22 taken along the line A-A.
Figure 23B:
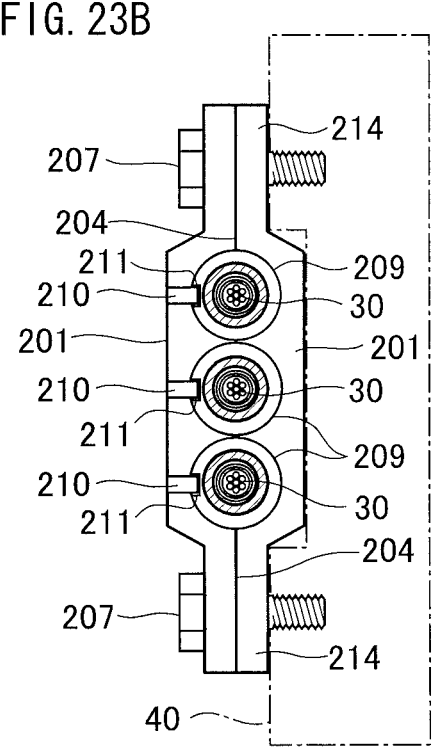
FIG. 23B is an expanded cross sectional view of FIG. 22 taken along the line B-B.
Figure 23C:
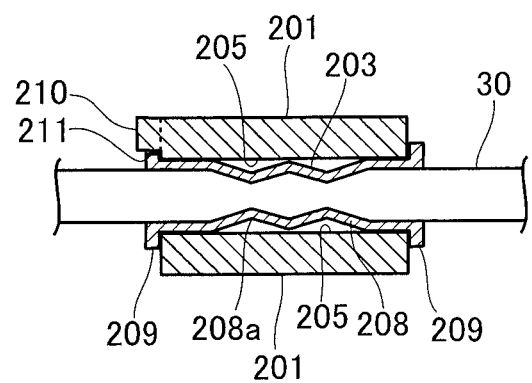
FIG. 23C is an expanded sectional view of FIG. 22 taken along the line C-C.

Thereafter, as shown in FIG. 22, the bolts 207 are inserted into the facing insertion holes 215, 215 of the bracket members 201, 201 positioned to the cables 30, and further as shown in FIG. 23A, the bolts 207 are tightened and fixed to the cable attaching member 40. Thus, the bracket members 201, 201 are fixed to the cable attaching member 40, and the facing surfaces 204, 204 of the bracket members 201, 201 are set in a close contact state or a tight contact state, to thereby grasp and fix the cables 30 between the facing grooves 205 and 205 of the bracket members 201, 201 through the intermediate member 203. At this time, as shown in FIG. 23C, both side faces of the bracket members 201, 201 are set in a contact state with the stopper parts 209, 209 of the intermediate member 203, to thereby inhibit the movement of the bracket members 201, 201 in the axial direction of the cables 30 by the stopper parts 209, 209 at both ends of the cylindrical part 208. Further, by grasping the cylindrical part 208 by the bracket members 201, 201, the rotation (twist) of the cables 30 due to a friction of the surface where the grooves 205 and the cylindrical part 208 are set in a contact state, can be inhibited. However, further as shown in FIG. 23B and FIG. 23C, protrusions 210 of the bracket members 201 are inserted and engaged into/with the notches 211 of the stopper parts 209, to thereby suppress or inhibit the rotation (twist) of the cables 30.

Note that as shown in FIG. 19 and FIG. 21, according to the embodiment 3-1, the protrusions 210 are provided on one side face of the bracket members 201 in the width direction. However, as shown in FIG. 24, the protrusions 210 may be provided at both sides of the bracket members 201 in the width direction. In this case, as shown in FIG. 24, the notches 211 are provided to the stopper parts 209 at both sides of the intermediate member 203, so as to correspond to the protrusions 210 at both sides in the width direction of the bracket members 201. Further, according to the embodiment 3-1, protrusion 210 is formed on one of the pair of bracket members 201, 201, and the protrusion 210 is not formed on the other bracket member 201. However, protrusions 210 may be formed on both the pair of bracket members 201, 201. In this case, a plurality of notches 211 are provided to the stopper parts 209 in an arrangement of 180 degrees in the peripheral direction of the cable. Further, the bracket members 201 of the embodiment 3-1 are used to grasp and fix the three cables 30. However, the bracket members having a plurality of grooves other than one or three may also be used.

According to the embodiment 3-1, one or a plurality of effects described below can be obtained.

(1) The attachment angle of the bracket members 201, 201 in the peripheral direction of the cables 30, and the attachment position of the bracket members 201, 201 in the axial direction of the cables 30, can be easily and surely determined by the engagement of the protrusions 210 of the bracket members 201 and the notches 211 of the intermediate member 203 (the attachment position is possibly slightly deviated, when the cables are clamped by determining the attachment position of the bracket members by measuring it visually without the aforementioned positioning structure or mechanism). Accordingly, the accuracy of assembling the cables 30 into the vehicle body, etc., is improved, and the layout of the cables as designed is possible. Further, since the protrusions 210 of the bracket members 201 are inserted into the notches 211 of the intermediate member 203, the movement of the cables 30 involving the twist (rotation) can be inhibited or suppressed, and as a result, possibility of disconnection, etc., due to a contact between the surrounding components and the cables, can be reduced.

(2) The cables 30 can be fixed with a sufficient grasping force, by a structure that the intermediate member 203 is crimped and firmly fixed to the cables 30, and the cables 30 are clamped and grasped by the bracket members 201, 201, through the intermediate member 203. Particularly, since the stopper parts 209, 209 are provided at both ends of the cylindrical part 208 of the intermediate member 203, even if an excessive tensile force is added to the cables 30, such a force can be received by the stopper parts 209, thus making it possible to prevent the deviation of the cables 30 as much as possible. Particularly, foreign matters such as mud and snow are adhered to the cables provided under the vehicle spring, thus making the cables with such foreign matters adhered thereto sometimes bent or vibrated, and at this time, the excessive tensile force is added to the cables. However, in this case as well, the cables can be sufficiently fixed and held.

(3) Since the cables 30 are clamped and grasped by the bracket members 201, 201 through the intermediate member 203, the grasping force of the bracket members 201, 201 to the cables 30 is equalized by the intermediate member 203. Therefore, even if a great force is added to the cables 30, an unintended force is not locally added to the cables 30 of the cable fixing part, thus making it possible to prevent the generation of troubles such as disconnection as a result, due to the deviation of the layout position of the cables.

(4) Owing to a simple structure that the intermediate member 203 crimped and tightened to the cables 30 is clamped by the bracket members 201, 201, to thereby grasp the cables 30, high reliability in an aspect of quality can be obtained, and the cost can be suppressed, because a plurality of cables 30 can be collectively fixed.

Embodiment 3-2

Figure 25:
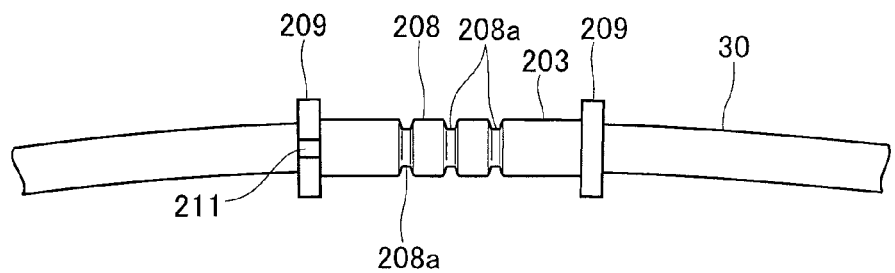
FIG. 25 is a view showing a state that the intermediate member according to the cable fixing member according to embodiment 3-2 of the present invention is crimped and tightened to the cable.
Figure 26A:
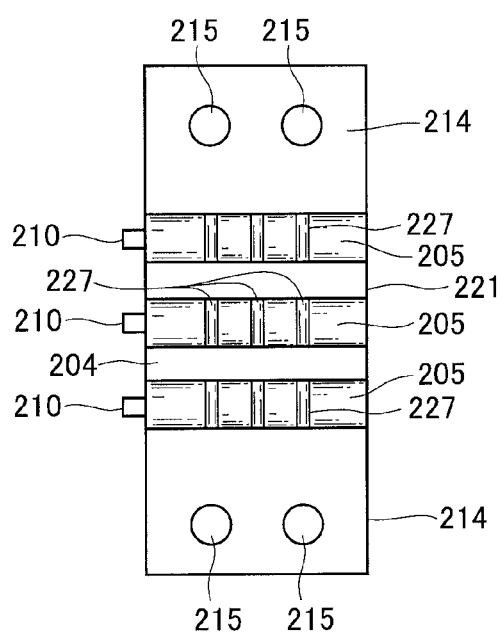
FIG. 26 is a view showing the facing surface side of a pair of bracket members in the cable fixing member according to the embodiment 3-2 of the present invention.
Figure 26B:
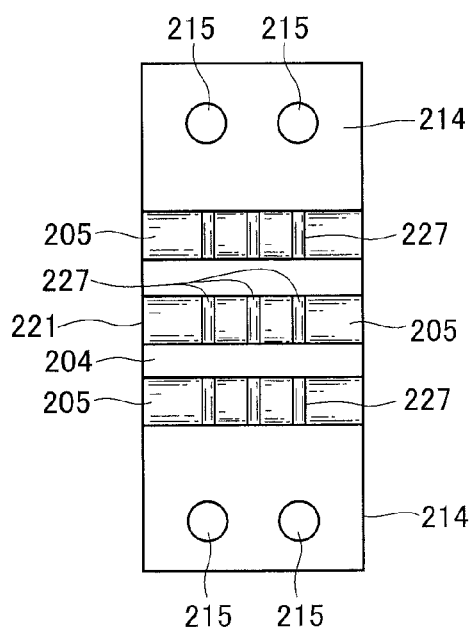

FIG. 25 is a view showing a state that the intermediate member in the cable fixing member according to the embodiment 3-2 of the present invention, is crimped and tightened to the cable. FIG. 26A and FIG. 26B are views showing the facing surface side of the pair of bracket members in the cable fixing member according to the embodiment 3-2 respectively.

The cable fixing member according to the embodiment 3-2 is also used for grasping three cables and fixing them to the vehicle body, etc., and therefore different points from the cable fixing member according to the embodiment 3-1 will be mainly described hereafter.

As shown in FIG. 25, similarly to the embodiment 3-1, intermediate member 203 of this embodiment has the cylindrical part 208 and the stopper parts 209 at both ends thereof. Notches 211 are formed on the stopper parts 209. The cylindrical part 208 of the intermediate member 203 is crimped at three places and attached to the cable 30.

Inner surface shapes of the grooves 205 of a pair of bracket members 221, 221 of this embodiment are formed to engage with the outer surface shapes of the cylindrical parts 208, so as to correspond to the outer surface shapes of the cylindrical parts 208 having crimped parts 208a formed to be recessed in ring shapes at three places. Namely, as shown in FIG. 26A and FIG. 26B, projected portions 227 along the peripheral direction of the grooves 205 are formed at three places in a direction of the grooves 205, so as to correspond to the crimping parts 208a formed to be recessed in ring shapes. Further, as shown in FIG. 26A, protrusions 210 are formed on the side face of one of the bracket members 221, so as to correspond to the notches 211 of the stopper parts 209.

Figure 27:
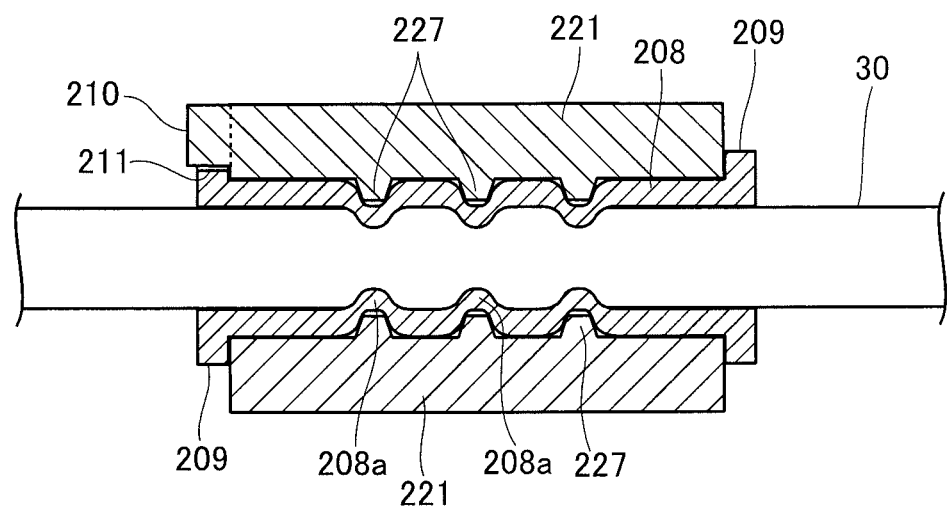
FIG. 27 is a sectional view of a state that the cable fixing member according the embodiment 3-2 of the present invention is fixed to the cable.

When the cylindrical part 208 of the intermediate member 203 crimped and tightened to the cable 30 is clamped and grasped between the grooves 205 and 205 of the pair of bracket members 221 and 221, as shown in FIG. 27, projected portions 227 of the grooves 5 are meshed with the depressed portions on the outer surface of the crimping parts 208a of the cylindrical part 208. In this embodiment, the positional deviation of the cable 30 in the axial direction can be further strongly inhibited, by an engagement structure of the projected portions 227 of the grooves 205 and the depressed portions on the outer surface of the crimping parts 208a, in addition to the structure of the stopper parts 209.

Further, the attachment angle and the fixing angle of the bracket members 221, 221 in the peripheral direction of the cable 30 can be easily determined by inserting the protrusions 210 of the bracket members 201 into the notches 211 of the stopper parts 209, when the cylindrical part 208 is clamped between the grooves 205 and 205 of a pair of bracket members 221, 221. Further, the rotation (twist) of the cable 30 can be controlled or inhibited by inserting the protrusions 210 of the bracket members 221 into the notches 211 of the stopper parts 209.

Embodiment 3-3

Figure 28:
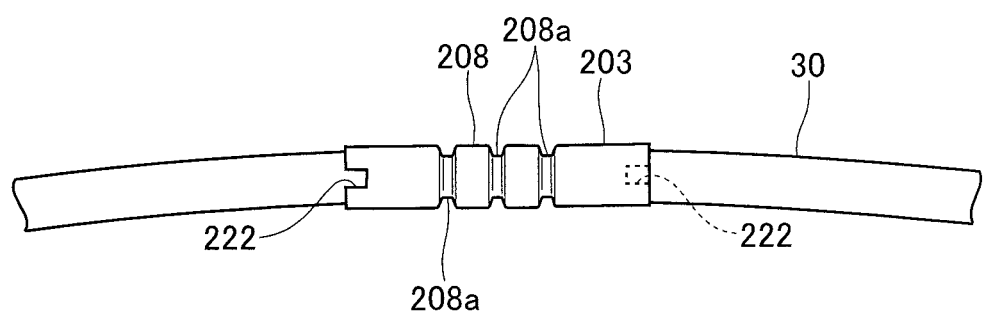
FIG. 28 is a view showing a state that the intermediate member in the cable fixing member according to the embodiment 3-3 of the present invention is crimped and tightened to the cable.
Figure 29:
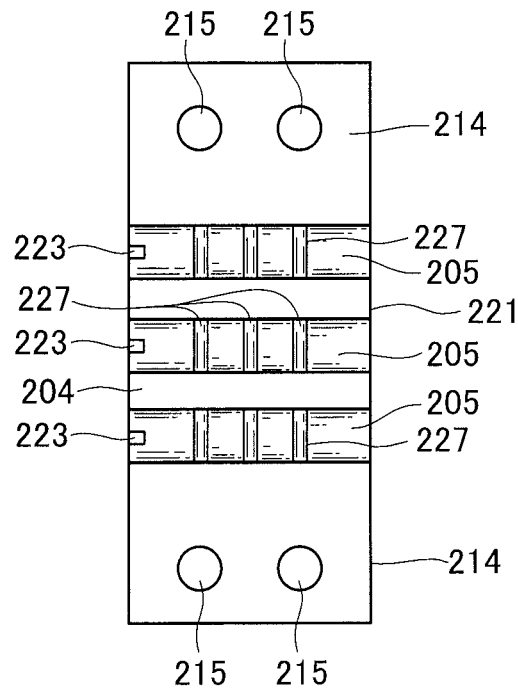
FIG. 29 is a view showing the facing surface side of the bracket members in the cable fixing member according to the embodiment 3-3 of the present invention.
Figure 30:
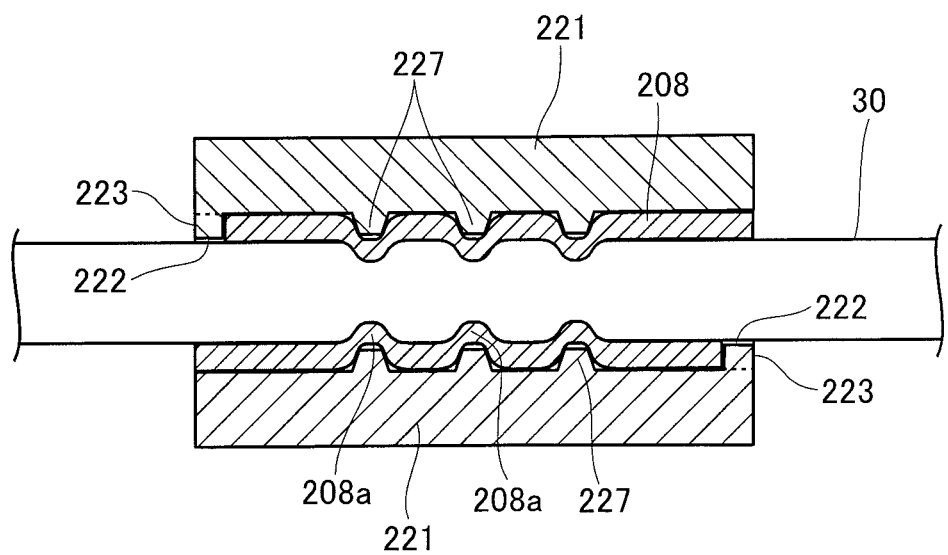
FIG. 30 is a sectional view of a state that the cable fixing member according to the embodiment 3-3 of the present invention is fixed to the cable.

FIG. 28 is a view showing a state that the intermediate member in the cable fixing member according to the embodiment 3-3 of the present invention is crimped and tightened to the cable, and FIG. 29 is a view showing the facing surface side of the bracket members in the cable fixing member according to the embodiment 3-3.

In the intermediate member 203 of the embodiment 3-3, the stopper parts 209 of the embodiments 3-1, 3-2 are omitted. Namely, as shown in FIG. 28, the intermediate member 203 of this embodiment is composed of the cylindrical part 208, and the center of the cylindrical part 208 is crimped at three places and is tightened to the cable 30. Rectangular notches 222 are respectively provided at both ends of the cylindrical part 208. Notch 222 at one end of the cylindrical part 208 and notch 222 at the other end are provided in an arrangement of 180 degrees in the peripheral direction of the cable.

Further, as shown in FIG. 29, similarly to the embodiment 3-2, projected portions 227 along the peripheral direction of the grooves 205 are formed on the grooves 205 of the pair of bracket members 221, 221, at three places in a direction of the grooves 205, so as to correspond to the crimping parts 208a formed to be recessed in ring shapes. Further, protrusion 223 is formed on one end of each groove 205 of the pair of bracket members 221, 221, so as to correspond to each notch 222 of the cylindrical part 208.

When the cylindrical part 208 crimped and tightened to the cable 30 is clamped and grasped between the grooves 205 and 205 of the pair of bracket members 221, 221, as shown in FIG. 29, projected portions 227 of the grooves 205 are meshed with the depressed portions on the outer surface of the crimping parts 208a of the cylindrical part 208. Namely, according to this embodiment, the positional deviation of the cable 30 in the axial direction is inhibited by the engagement structure of the projected portions 227 and the crimping parts 208a.

Further, when the cylindrical part 208 is clamped by the pair of bracket members 221 and 221, as shown in FIG. 29, the attachment angle and the fixing angle of the bracket members 221, 221 in the peripheral direction of the cable 30 are determined by inserting the protrusions 223 of the bracket members 221 into the notches 222 of the cylindrical parts 208. Further, the rotation (twist) of the cable 30 can be controlled or suppressed by inserting the protrusions 223 of the bracket members 221 into the notches 222 of the cylindrical parts 208.

Other Embodiment

Note that although the notches 211, 222 of the intermediate member 203 of the embodiments 3-1 to 3-3 are formed into groove shapes or notch shapes, the notches of the intermediate member may be formed into holes or set in a stepped state. Further, the attachment position and the attachment angle of the bracket members to the intermediate member may be determined by forming the notches of the intermediate member larger than the protrusions of the bracket members and by making the side faces of the protrusions of the bracket members brought into contact with the inner surfaces of the notches of the intermediate member.

Further, in the bracket members 201 and 221 of the embodiments 3-1 to 3-3, at least one of the attachment parts 214 and 214 may be formed to be bent to the center for grasping the cable. Bending of the attachment parts is sometimes suitable from the viewpoint of the installation space and workability, when the cable is installed and fixed to a narrow place. Further, when the attachment parts are bent, in order to improve the strength of the bracket members, the attachment parts are preferably formed thick or the rib is preferably provided on the surface of the opposite side to the facing surfaces of the bracket members.

Further, according to the embodiment 3-1, as shown in FIG. 23A, the attachment parts 214, 214 at both sides of the bracket member 201 are tightened to the cable attaching member 40 by the bolts 207. However, simply the bracket members 201 and 201 may be tightened to each other, instead of fixing one of the attachment parts 214 to the cable attaching member 40.

What is claimed is:
1. A cable fixing member, comprising:
an intermediate member crimped and tightened to a cable that is provided under a vehicle spring;
a pair of bracket members for clamping and grasping one or a plurality of cables through the intermediate member; and
one or a plurality of grooves formed on facing surfaces of the pair of bracket members, for clamping the one or a plurality of cables through the intermediate member,
wherein an inner surface shape of the one or a plurality of grooves is formed to mesh with an outer surface shape of the intermediate member which is crimped and tightened to the cable,
wherein a projected portion is formed on the inner surface of the one or a plurality of grooves, and the projected portion is meshed with a depressed portion of a crimping part of the intermediate member which is formed by being crimped to the cable.

2. The cable fixing member according to claim 1, further comprising:
a tightening member for tightening the pair of bracket members that clamp the one or a plurality of cables.

3. A cable fixing structure that fixes a cable having a reinforcing braid on an outer peripheral part of the cable to a cable attaching member, by using the cable fixing member according to claim 1.

4. A cable fixing member, comprising:
an intermediate member crimped and tightened to a cable that is provided under a vehicle spring:
a pair of bracket members for clamping and grasping one or a plurality of cables through the intermediate member;
one or a plurality of grooves formed on facing surfaces of the pair of bracket members, for clamping the one or a plurality of cables through the intermediate member;
a notch provided on the intermediate member; and
a protrusion provided on the bracket members, so as to be inserted into the notch,
wherein an inner surface shape of the one or a plurality of grooves is formed to mesh with an outer surface shape of the intermediate member which is crimped and tightened to the cable,
wherein a projected portion is formed on the inner surface of the one or a plurality of grooves, and the projected portion is meshed with a depressed portion of a crimping part of the intermediate member which is formed by being crimped to the cable.

5. The cable fixing member according to claim 4, wherein the intermediate member comprises:
a cylindrical part into which the cable is inserted and which is crimped and tightened to the cable; and
stopper parts formed to protrude in a radial direction of the cable at both ends of the cylindrical part, so as to inhibit a movement of the cable relative to the pair of bracket members in an axial direction.

6. The cable fixing member according to claim 4, further comprising:
a tightening member for tightening the pair of bracket members that clamp the one or a plurality of cables.

7. A cable fixing structure that fixes a cable having a reinforcing braid on an outer peripheral part of the cable to a cable attaching member, by using the cable fixing member according to claim 4.

8. The cable fixing member according to claim 1, wherein the intermediate member is crimped and tightened to the cable.

* * * * *